Dec. 27, 1960  C. H. CAESAR ET AL  2,966,451
DESORPTION PROCESS WHEREIN A PORTION OF THE ADSORBATE
IS BURNED WITH AN OXYGEN-CONTAINING
GAS UTILIZING A MOVING HEAT FRONT
Filed May 20, 1957
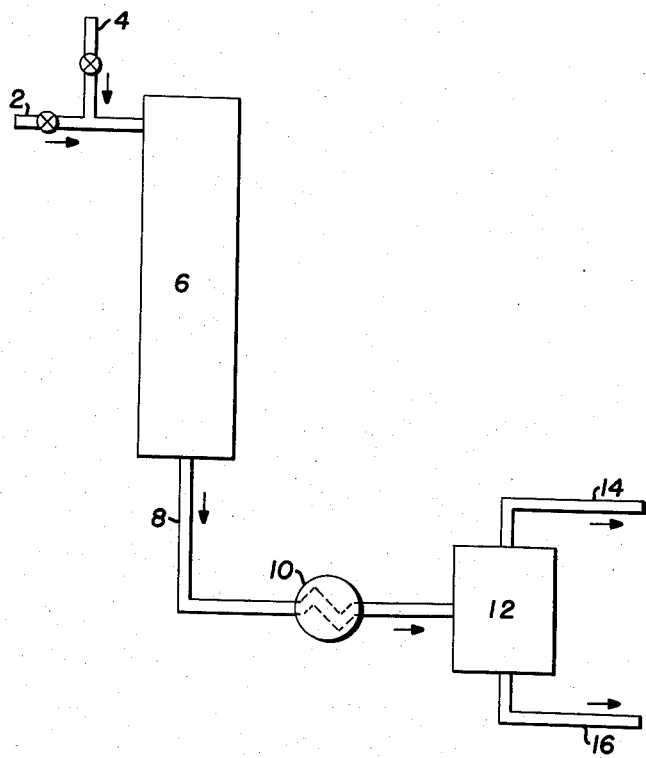
Cameron H. Caesar
Georges G. Lukk        Inventors
Francesco Bonmartini
By *Richard J. Nagel* Attorney

United States Patent Office 2,966,451
Patented Dec. 27, 1960

2,966,451

DESORPTION PROCESS WHEREIN A PORTION OF THE ADSORBATE IS BURNED WITH AN OXYGEN-CONTAINING GAS UTILIZING A MOVING HEAT FRONT

Cameron H. Caesar and Georges G. Lukk, Sarnia, Ontario, Canada, and Francesco Bonmartini, Elizabeth, N.J., assignors to Esso Research and Engineering Company, a corporation of Delaware Filed May 20, 1957, Ser. No. 660,397

8 Claims. (Cl. 208—26)

The present invention relates to a process for separating and segregating straight chained hydrocarbons from mixtures thereof with branch chained and/or cyclic or aromatic hydrocarbons. More particularly, the present invention relates to the desorption of relatively straight chain, normal hydrocarbons from isomeric branch chained and cyclic compounds employing a class of natural or synthetic adsorbents termed, because of their ability to separate molecules on the basis of size, molecular sieves. Still more particularly, the present invention relates to an improved desorption process whereby the hydrocarbon adsorbed on the sieve is recovered in a manner considerably more efficient and economical than hitherto found possible.

It has been known for some time that certain zeolites, both naturally-occurring and synthetic, have the property of separating normal from isomeric branch chained hydrocarbons, as well as from cyclic and aromatic admixtures. These zeolites have crystalline structures containing a large number of small cavities interconnected by a number of still smaller holes or pores, the latter being of exceptional uniformity of size. Only molecules small enough to enter the pores can be adsorbed, though not all molecules, even though small enough to enter the pores, will be adsorbed. An affinity of the molecule for the adsorbent must be present. The pores may vary in diameter from 3 Angstrom units to 15 or more, but it is a property of these zeolites, or molecular sieves, that for a particular sieve the pores are of substantially uniform size.

The scientific and patent literature contains numerous references to the adsorbing action of natural and synthetic zeolites. Among the natural zeolites having this sieve property may be mentioned chabasites, analcite, and mordenite. A synthetic zeolite with molecular sieve properties is described in U.S. 2,442,191. Zeolites vary somewhat in composition, but generally contain silica, aluminum, oxygen, and an alkali and/or alkaline earth element, e.g. sodium and/or calcium, magnesium, etc. Analcite has the empirical formula $NaAlSi_2O_6 \cdot H_2O$. Barrer (U.S. 2,306,610) teaches that all or part of the sodium is replaceable by calcium to yield, on dehydration, a molecular sieve having the formula $(CaNa_2)Al_2Si_4O_{12} \cdot 2H_2O$. Black (U.S. 2,522,426) describes a synthetic molecular sieve having the formula $4CaO \cdot Al_2O_3 \cdot 4SiO_2$. A large number of other naturally-occurring zeolites having molecular sieve activity, i.e. the ability to adsorb a straight-chain hydrocarbon and exclude the branch chain isomers, are described in an article "Molecular Sieve Action of Solids" appearing in Quarterly Reviews, vol. III, pp. 293-330 (1949), and published by the Chemical Society (London).

The separation of normal from branch chain or aromatic hydrocarbons or mixtures, either for the purpose of enriching the mixture in branch chain, cyclic or aromatic components, or for isolating and recovering of the normal isomer, has become increasingly important in industry. Thus, in the preparation of high octane fuels, the presence of normal paraffins degrades the octane rating. On the other hand, in the manufacture of synthetic detergents such as alkyl aryl sulfonates, a straight chain nuclear alkyl substituent makes for better detergency characteristics than a branch chained substituent of the same number of carbon atoms. Many other examples may be cited.

Though it has in the past been proposed to make these separations, i.e. of normal from isomeric hydrocarbons and aromatics by molecular sieves, and though excellent and selective separations of one constituent have been realized, a serious problem has arisen when it was attempted to desorb and regenerate the molecular sieve or zeolite. Conventional means, such as steaming, purging with an inert gas such as nitrogen or methane, evacuation, all have proven unsatisfactory. In commercial applications it is necessary to employ a cyclic operation, i.e. an adsorption step followed by desorption and regeneration of the sieve, followed by a second adsorption step, etc. The desorption means enumerated above have been found unsatisfactory, and in some cases causing deterioration of the zeolite and marked decline in adsorptive capacity. For instance, in a process wherein a virgin naphtha fraction was treated with a synthetic molecular sieve having a pore diameter of 5 Angstroms to separate normal from branch chain constituents and thereby increase the octane number, and the sieves desorbed and regenerated between cycles by steam stripping followed by nitrogen flushing, the sieves decreased in capacity to 59% of fresh capacity after only three cycles. Similarly, the effect of continued treatment of the sieves with steam at the high stripping temperatures of about 600° to 900° F. is to cause deterioration.

It has further been found that though initially sieves have high capacity for adsorbing hydrocarbons, this selectivity drops steadily with increasing number of cycles of adsorption and desorption. The drop has been attributed to the formation of polymeric material on the sieves, or to sieve poisons of various sorts.

It is therefore the principal object of the present invention to set forth an improved method of desorbing and stripping hydrocarbons adsorbed in the uniform pores and cavities of certain natural or synthetic zeolites, customarily called molecular sieves.

It is also a purpose of the present invention to provide a desorption means which prolongs substantially the life of the molecular sieve.

Other and further objects and advantages of the present invention will appear in the following more detailed description and claims.

In accordance with the present invention, the difficulties and disadvantages have been overcome by employing a totally different concept of desorption, to wit, the employment of an oxygen-containing gas to effect a partial combustion of the adsorbed material. Initially, oxygen is consumed at the reactor inlet, causing a temperature rise in this and the immediately following region. By controlling carefully the reaction conditions and percentage composition of oxygen in the gas, the temperature in the bed is readily controlled. The rise in temperature causes desorption in the hot region, and this desorption is enhanced by the water that is formed during combustion and is vaporized. As combustible matter is consumed, the hot region moves progressively to the reactor outlet, until all of the adsorbate is desorbed. Surprisingly, the amount of adsorbate consumed is insignificant, and normally amounts to 1 to 3%, and less.

The invention, though generally applicable to desorbing hydrocarbons, is particularly applicable to the removal of wax from middle distillates. The heavier long chain wax hydrocarbons are particularly difficult to remove from the sieves. By the process of the present invention, however, this is readily achieved.

The process of the present invention will be more clearly understood when read in conjunction with the drawing which represents a preferred embodiment thereof.

Turning now to the drawing, a hydrocarbon feed, which may be a narrow cut virgin or catalytic naphtha, a hydroformate, a lubricating oil, diesel cut, or, for purposes of this illustration, a middle distillate boiling in the range of from about 300° to 700° F., and containing up to 25% or more of wax, is passed via line 2 into tower 6. The feed preferably is preheated to sorption temperatures, and may be passed into tower 6 as a vapor along with, if desired, an inert carrier gas such as nitrogen or $CO_2$, or light hydrocarbon gas admitted through line 4. As an alternative, the hydrocarbon feed may be admitted as a liquid, with or without the additional inert carrier gas, and vaporized by conventional thermal means in the upper portion of vessel 6.

This vessel is packed with molecular sieve adsorbents of the type described hitherto. The diameter of the pores chosen depends upon the size of the molecules which it is desired to retain. Thus, when it is desired to separate normal paraffins and olefins from mixtures containing them, i.e. such admixtures as isoparaffins, cyclics, naphthenes or aromatics, a molecular sieve having a pore diameter of 5 Angstroms is employed. This is suitable, for instance, for treating middle distillates, light virgin and catalytic naphthas, hydroformates and the like. A zeolite of this nature is readily synthesized by heating together sodium metasilicate and sodium aluminate, maintaining the reaction mixture at 180° to 220° F. for a half hour or longer, filtering off a crystalline zeolite having the formula $Na_2O.Al_2O_3.2SiO_2.XH_2O$, base exchanging with a calcium salt, and calcining. When it is desired to segregate larger molecules, such as aromatics, from their mixtures or from one another, a larger pore diameter sieve having 10 to 15 Angstrom openings may be required.

Tower 6 may be provided with means for maintaining heat therein, as closed steam coils, electrical means, or the like. Adsorption conditions will vary in accordance with the nature of the feed being treated. Thus, temperatures may vary from 100° to 850° F. depending upon whether a light naphtha or a heavy middle distillate is the feed; similarly the pressures may vary from as low as 0.1 mm. to 500 p.s.i.g., being chosen in accordance with the feed and to avoid cracking. Feed rates of 0.1 to 10 v./v./hr. may be employed. In treating a middle distillate, the preferred conditions for adsorption are temperatures of about 400° to 850° F., pressures of 0.2 to 760 mm., and feed rates of 0.5 to 1.0 v./v./hr.

The straight chain constituents, in the case of middle distillates mostly waxy compounds, are adsorbed, while the corresponding branch chain and cyclic constituents, comprising the bulk of the oil, pass through unadsorbed, are withdrawn through line 8, cooled in cooler 10, and discharged to accumulator 12, to provide a low pour point middle distillate which may be employed as a diesel fuel, lubricant, or other service with or without further processing, all in a manner known per se.

When no more wax is being adsorbed, as determined by the increase in pour point back to a value approaching that of the feed, the desorption portion of the cycle begins. Oxygen, an oxygen-containing gas such as air or the like, is passed through line 2 into vessel 6. An inert carrier gas is preferably also employed, such as $N_2$, $CO_2$, or other noncombustible gas. This is admitted through line 4, though the gases may be pre-mixed, if desired. Further, it is advantageous to purge the adsorption vessel 6 prior to the admission of oxygen to remove hold-up hydrocarbons that are surface adsorbed. A vacuum may also be applied for this purpose.

In accordance with the present invention, the adsorbed hydrocarbons are desorbed and recovered substantially in quantitative yields by carrying out the desorption by an advancing hot front. Though normally it is highly undesirable to expose the sieve ot high temperatures for any extended period of time, i.e. 1000° F. or over, it has been found that by the process of the present invention, any single section of the sieve bed is subjected to the downward moving hot front for only a very short period of time. Similarly, though water and steam at high temperature of 1000° F., and over, are quite deleterious to sieves, there is a minimum concentration of water vapor in the hot gases resulting from the combustion. The hydrogen-rich component of the adsorbate is volatilized by the advancing heat front moving along the bed. Left behind for combustion is non-vaporizable, hydrogen-poor carbonaceous material.

To initiate combustion and maintain a moving heat front, it is desirable to preheat the incoming desorbing gas stream. Temperatures of 600° F. and higher are normally necessary to provide ignition, though the ignition temperature also is dependent upon the properties and nature of the desorbate, the pressure, oxygen concentration, and possibly even upon the nature of the binder employed in pelleting the crystalline zeolite sieve. In general, a preheat temperature of about 600 to 1100° is employed. With lower total pressure and oxygen concentrations of about 1 to 5%, the higher preheat temperatures may be employed. These temperatures also obtain in the bed of sieves in vessel 6, and the gases may be preheated within the vessel rather than prior to passage to vessel 6.

During the combustion, the temperatures of the hot zone significantly exceeds that of the bed. This hot zone moves along the bed, and any one section thereof is at peak temperatures for only a brief interval, and the crystals are not significantly impaired thereby. This hot zone is at fairly uniform temperature as it moves along the bed, and may reach as high as 1600° F., though 800° to 1200° F. are preferred. The average bed temperature during the regeneration step is about 600° to 1000° F.

The pressure within vessel 6 during regeneration may vary from 0.1 mm. to atmospheric. Generally, at the higher pressure levels it is preferred to employ lower oxygen concentrations in the gas. This may vary from pure oxygen to 0.5% oxygen, with a gas composition containing 5 to 20 volume percent being preferred. The amount of oxygen needed to remove the desorbate is quite small, since most of the latter is recovered unchanged.

The displaced and desorbed n-paraffins and gases are withdrawn downwardly through line 8 and cooler 10, and are passed to separator 12. Normal paraffins are recovered through line 16 and vapors and combustion gases withdrawn overhead through line 14.

At the end of the cycle, fresh feed is reintroduced through line 2 and the adsorption phase of the process resumes, as described hitherto.

The process of the present invention may be subjected to many variations without departing from its scope. Thus, instead of a fixed bed within tower 6, a moving or slurry bed may be used. It may also be carried out in the liquid phase over a fixed bed. Combustion gases may be injected upflow as well as downflow through vessel 6. A substantial advantage of the present invention is the obviating of the necessity of regenerating the bed after a certain number of adsorption-desorption cycles, as has always been found necessary with other desorbing means. In the present process, there is no loss in capacity even after a large number of cycles. In other desorption processes, as by steam, inert gas, vacuum, displacement and the like, polymer and carbonaceous deposits form on the sieves and these require interruption of the cyclic process, for sieve capacity drops, and these deposits must be removed.

The process of the present invention may be further illustrated by the specific examples below.

EXAMPLE 1

Table I below depicts two runs made in accordance with the present invention. A mixed blend virgin gas oil boiling between about 330° to 666° F. was passed through a fixed bed of molecular sieves of 5 Angstroms pore diameters, pelleted in 1/16 inch pellets.

It is readily apparent here that not only was a completely carbon-free sieve recovered after the regeneration, but also that only insignificant amounts of adsorbate was used up in the combustion. Thus, in run A, 99.9% of the initial feed was recovered, and in run B, 97.7%.

The important criterion of a desorption process or cycle is the maintenance of capacity, i.e. the ability of the desorbed sieve to remove the same amount of normal paraffins as the fresh sieve. The excellent results obtained by the process of the present invention is clearly shown in Tables II and III. In Table II are shown the reaction conditions obtaining in each cycle of run B. In Table III, the inspection of the desorbed product is set forth. As criterion of separation, the pour point of the raffinate is used. It will be noted at once from Table III that the cloud and pour points of the raffinate of succeeding cycles are at least as good, i.e. low, as that of the fresh sieve (end of cycle).

*Table I.—Cyclic molecular sieve treating of middle distillates with reactivation by partial combustion*

[Vapor phase operation on 330/666° F. mixed blend virgin gas oil through fixed bed of 1/16" 5A sieves]

| Run | A | B |
|---|---|---|
| Operating Conditions | | |
| Vapor Flow | upflow through 185 g. of sieves | downflow through 500 g. of sieves |
| Temperature (° F.): | | |
| Sorption average | 610 | 400 |
| Reactivation average | 700 | 650 |
| Reactivation maximum | 955 | 1100 |
| Pressure (mm. Hg): | | |
| Sorption average | 1 | 0.7 |
| Reactivation average | 25 | 200+ |
| Average Feed rate (W./W./hr.) | 0.5 | 0.8 |
| Oxygen content of reactivation gas (vol. percent) [1] | <20 | 20 |
| No. of Cycles | 10 | 10 |
| Average charge per cycle (g/100 g. of sieves) | 81 | 80 |
| Yields (wt. percent on charge): | | |
| Raffinate | 91 | 86 |
| Desorbate | 8.9 | 11.7 |
| Water [2] | | 1.8 |
| Carbon on Sieves | | |

[1] Reactivation gas is oxygen in nitrogen carrier except run B, cycles 5, 6, 7 where air was used.
[2] As equivalent adsorbate, calculated on the assumption that water was produced by complete oxidation of $(CH_2)_n \to nCO_2 + nH_2O$.

*Table II.—Operating conditions of run B molecular sieves treating of middle distillates*

| Cycles | Sorption | | | | Reactivation [1] | | |
|---|---|---|---|---|---|---|---|
| | Av. Temp., °F. | Max. Temp., °F. | Press., mm. Hg | Feed Rate, W./W./hr | Av. Temp., °F. | Max. Temp., °F. | Pressure, mm. Hg |
| 1 | 350 | 610 | 0.6 | 2.3 | 700 | 1100 | 200+ |
| 2 | 350 | 600 | 0.7 | 0.96 | 700 | 950 | 200+ |
| 3 | 390 | 400 | 0.7 | 0.66 | 400 | 1100 | 200+ |
| 4 | 380 | 440 | 0.7 | 0.65 | 450 | 950 | 200+ |
| 5 | 420 | 600 | 0.7 | 0.49 | 560 | 1000 | 200+ |
| 6 | 440 | 540 | 0.5 | 0.82 | 550 | 1150 | 200+ |
| 7 | 460 | 625 | 0.7 | 0.87 | 600 | 1600+ | 200+ |
| 8 | 350 | 650 | 0.5 | 0.6 | 550 | 950 | 200+ |
| 9 | 350 | 580 | 0.7 | 1.3 | 720 | 1150 | 200+ |
| 10 | 350 | 650 | 0.7 | 0.86 | 600 | 1100 | 200+ |

[1] Reactivation gas for cycles 5, 6, 7, 8 is air; remaining cycles, oxygen in nitrogen carrier

*Table III.—Inspections on samples from run B*

| Cycle No. | Raffinate Inspections | | | | | | | Desorbate Inspections | | | | |
|---|---|---|---|---|---|---|---|---|---|---|---|---|
| | R.I. | Pour Pt., °F. | Cloud Pt., °F. | Aniline Pt., °F. | Bromine No. | Wt. Percent Sulphur | SUS Visc., 100° F. | R.I. | Pour Pt., °F. | Cloud Pt., °F. | Bromine No. | Wt. Percent Sulphur |
| 1 | 1.4675 | −30 | −8 | 149 | 0.4 | 0.31 | 35 | 1.4421 | +55 | +55 | 0.4 | 0.08 |
| 2 | 1.4672 | −45 | −42 | 146 | 0.4 | 0.29 | 35 | | | | | |
| 3 | 1.4671 | −30 | −28 | 149 | 0.4 | 0.31 | 35 | 1.4448 | +60 | +60 | 0.3 | 0.07 |
| 4 | 1.4645 | −35 | −34 | | 0.4 | 0.33 | 34 | | | | | |
| 5 | 1.4656 | −30 | −22 | 147 | 0.4 | 0.28 | 35 | 1.4488 | +60 | +60 | 0.4 | 0.08 |
| 6 | 1.4648 | −35 | −24 | 148 | 0.5 | 0.28 | 35 | | | | | |
| 7 | 1.4664 | −35 | −38 | 147 | 0.3 | 0.33 | 35 | 1.4478 | +55 | | 0.4 | 0.06 |
| 8 | 1.4674 | −50 | −50 | 146 | 0.5 | 0.33 | 35 | | | | | |
| 9 | | Sample lost due to breakage | | | | | | | | | | |
| 10 | 1.4673 | −50 | −54 | 146 | 0.3 | 0.31 | 35 | 1.4480 | +55 | +48 | 0.4 | 0.05 |

Feed R.I. 1.4630; Pour Pt. +5° F.; Cloud Pt. +16° F.; Aniline Pt. 153° F.; Bromine No. 0.4; Percent Sulphur 0.29; SUS Viscosity at 100° F. 35.

EXAMPLE 2

It is instructive to compare the results obtained by the partial combustion process of the present invention with those obtained by desorption by more conventional methods. In the four runs below, steam was employed as the desorbent and the bed was maintained at substantially the same average temperature as in the case of Example 1. It will be at once evident that though at the end of the first cycle, the pour point of the oil had dropped from +15 to −70, at the end of the second cycle there was substantially no reduction in raffinate pour point, indicating rapid and complete loss of capacity.

*Table IV.—Molecular sieve treating of middle distillates n-paraffin sorption/steam desorption cycles*

INSPECTIONS

[Feed 509 IBP/609 FBP Virgin Leduc Fraction]

| Run | C | D | E | F |
|---|---|---|---|---|
| Pressure (mm. Hg) | 10 | 10 | 100 | 100 |
| Temperature (° F.) | 600 | 800 | 600 | 800 |
| Pour Points, ° F.: | | | | |
| Feed | +15 | +15 | +15 | +15 |
| First Cycle Reaffinate— | | | | |
| First 27 g./100 g. of sieves | −70 | −70 | −55 | −75 |
| Second 27 g./100 g. of sieves | −35 | −50 | +5 | −15 |
| Remaining Raffinate | +10 | +10 | +15 | +10 |
| Second Cycle Raffinate— | | | | |
| First 27 g./100 g. of sieves | 0 | −5 | +5 | +5 |
| Second 27 g./100 g. of sieves | +15 | +15 | +10 | +15 |
| Remaining Raffinate | +15 | +15 | +15 | +15 |
| Refractive Indices (20° C.): | | | | |
| Feed | 1.4826 | 1.4826 | 1.4826 | 1.4826 |
| Equiv. n-Paraffin | 1.4370 | 1.4370 | 1.4370 | 1.4370 |
| First Cycle Desorbate | 1.4827 | 1.4657 | 1.4836 | 1.4791 |
| Second Cycle Desorbate | 1.4823 | 1.4510 | 1.4830 | 1.4805 |
| Bromine Numbers: | | | | |
| Feed | 8.0 | 8.0 | 8.0 | 8.0 |
| First Cycle Raffinate | 8.0 | 9.0 | 8.0 | 9.5 |

What is claimed is:

1. In a process for selectively separating straight chain hydrocarbons from admixture with other hydrocarbons wherein said mixture is passed into a zeolitic molecular sieve adsorption zone and said straight chain hydrocarbon selectively adsorbed, the improvement which comprises thereafter passing a gas containing from about 0.5 to about 20% free molecular oxygen through said zone, maintaining an average bed temperature of from 600–1000° F. and a pressure of from 0.1 to 760 mm. in said zone, creating a moving heat front by burning a minor proportion of the adsorbate within said zone, said moving front having a temperature higher than the average bed temperature, and withdrawing desorbed hydrocarbons from said zone.

2. The process of claim 1, wherein said molecular sieves have a uniform pore diameter of about 5 Angstroms.

3. The process of claim 1, wherein said oxygen-containing gas is air and wherein not more than about 3% of said adsorbed straight chain hydrocarbons based on said mixture are burned.

4. An improved process for separating straight chain paraffinic hydrocarbons from mixtures with other hydrocarbons which comprises passing a vaporized stream of said mixture into a zeolitic molecular sieve adsorption zone, said sieves having a pore diameter of about 5 Angstroms, maintaining a temperature of from about 100° to 850° F., in said zone, withdrawing unadsorbed non-straight chain hydrocarbons from said zone while adsorbing straight chain hydrocarbons, thereafter passing a gas containing from about 0.5 to about 20 volume percent of free molecular oxygen through said zone, preheating said gas to a temperature at least about 600° F., maintaining an average bed temperature of from about 600° to 1000° F. in said zone, creating a moving heat front by burning a minor portion of the adsorbate within said zone, said moving front having a temperature higher than said average bed temperature, maintaining a pressure of from about 0.1 to 760 mm. in said zone, and withdrawing desorbed hydrocarbons from said zone.

5. The process of claim 4, wherein said oxygen-containing gas stream is introduced at one end of said desorption zone, and the desorbed hydrocarbons withdrawn from the other end.

6. The process of claim 4, wherein said oxygen containing gas comprises an inert carrier gas.

7. The process of claim 4, wherein said adsorption zone is purged prior to passage of said oxygen-containing gas.

8. An improved process for dewaxing middle distillate which comprises passing a vaporized feed stream of middle distillate boiling in the range from about 300–700° F. into a zeolitic molecular sieve in the adsorption zone, maintaining a temperature of about 400–850° F., pressure of 0.2 to 760 mm. and feed rates of 0.2 to 2.0 v./v./hr. in said zone, adsorbing wax in said zone, withdrawing from said zone a middle distillate of substantially reduced pour point, thereafter passing a gas containing from 0.5 to 20% oxygen into an upper portion of said zone, said gas being preheated to at least 600° F., maintaining a temperature of from about 600–1000° F. and a pressure of from about 0.1 to 760 mm. in said zone combusting no more than about 3% of the adsorbed wax based on said feed stream, withdrawing a stream containing the uncombusted wax previously adsorbed on said sieves, and cooling said zone.

References Cited in the file of this patent

UNITED STATES PATENTS

| | | |
|---|---|---|
| 2,345,774 | Simpson | Apr. 4, 1944 |
| 2,574,434 | Greentree et al. | Nov. 6, 1951 |
| 2,818,137 | Richmond et al. | Dec. 31, 1957 |
| 2,818,455 | Ballard et al. | Dec. 31, 1957 |
| 2,859,170 | Dickens et al. | Nov. 4, 1958 |
| 2,859,173 | Hess et al. | Nov. 4, 1958 |
| 2,886,522 | Cooper et al. | May 12, 1959 |
| 2,900,430 | Henke et al. | Aug. 18, 1959 |